Feb. 14, 1956

R. J. DOLUDE 2,734,385

GRAVITY ERECTION FOR GYROVERTICALS

Filed April 1, 1953

ROMAN J. DOLUDE,
INVENTOR.

BY R. E. Granque

ATTORNEY

Feb. 14, 1956  R. J. DOLUDE  2,734,385
GRAVITY ERECTION FOR GYROVERTICALS
Filed April 1, 1953  3 Sheets-Sheet 2

ROMAN J. DOLUDE,
INVENTOR.

BY R. E. Jeangue

ATTORNEY

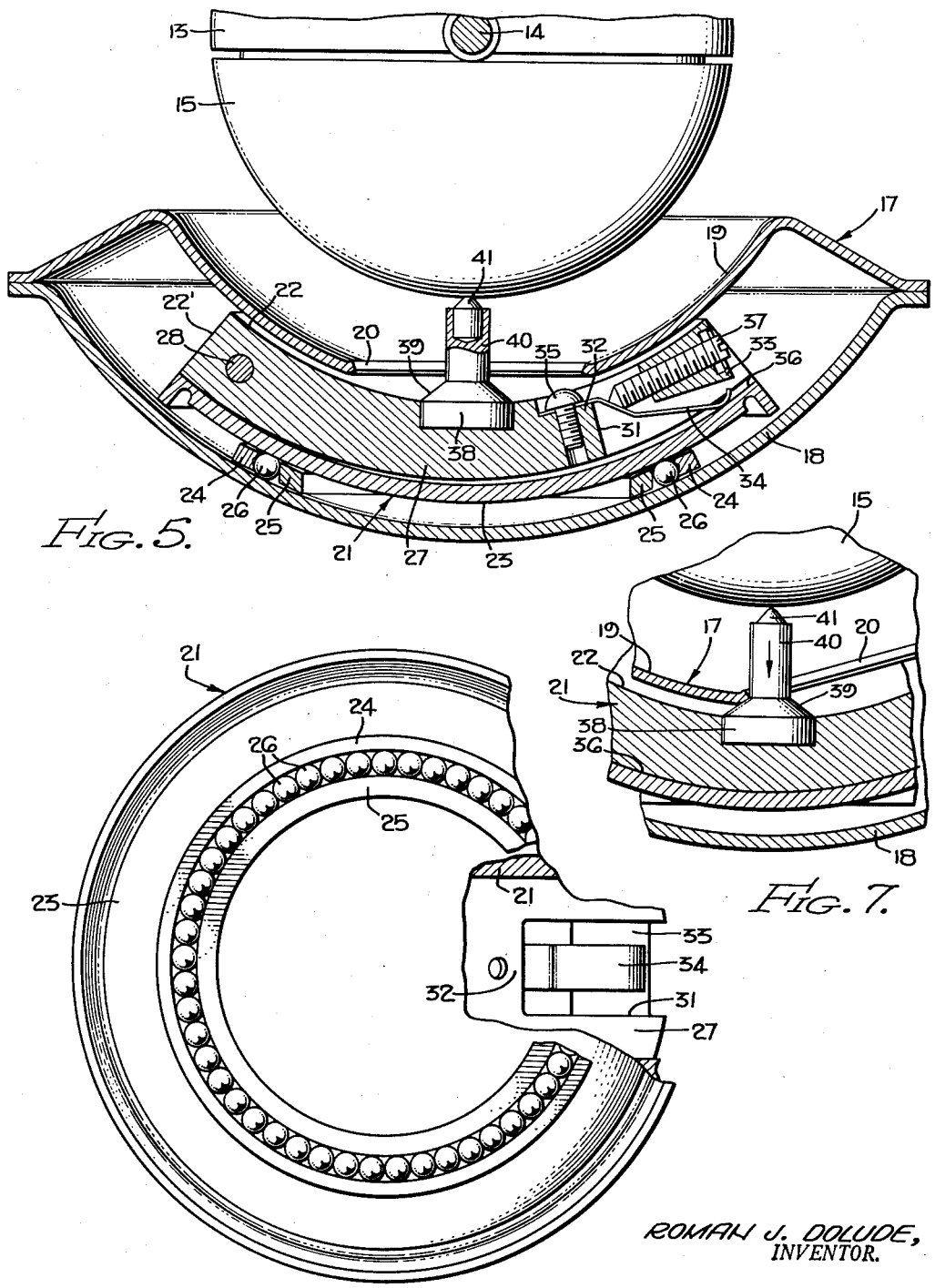

United States Patent Office 2,734,385
Patented Feb. 14, 1956

2,734,385

GRAVITY ERECTION FOR GYROVERTICALS

Roman J. Dolude, Los Angeles, Calif., assignor to Summers Gyroscope Company, Santa Monica, Calif., a corporation of California Application April 1, 1953, Serial No. 346,151

15 Claims. (Cl. 74—5.45)

This invention relates to gyroverticals, and more particularly to a gravity-sensitive device to erect the spin axis of a gyroscope into alignment with dynamic vertical.

In co-pending application, Serial No. 320,090, filed November 12, 1952, by Thomas O. Summers, Jr., a gravity erecting device is described which is complicated in that the mechanism requires a pivotally supported bail and a carriage adapted to ride along a precision track. Such a mechanism is extremely costly when compared to the relatively simple mechanism of the present invention, which will accomplish substantially the same end. This invention consists basically of a simple universally supported mass to which is fixed an erecting button adapted to engage a spherical dome attached to the gyro motor. The principle of erection is the same as described in the aforesaid co-pending application. However, the construction is simpler, and the device has the added advantage that should the aircraft go into an extremely steep dive or climb, the erecting button will automatically disengage itself from the dome and thereby free the gyroscope so that an erecting error does not result from the mass having reached the limit of its angular freedom. In the device of the aforesaid co-pending application, should an aircraft equipped with the gyrovertical of that invention reach the limit of the angular freedom of the erecting mechanism, the gyro spin axis will be erected into the lateral or athwartship plane of the aircraft and thus make a considerable error. In addition, the erecting mass of the present invention is equipped with means for disengaging the erecting button should the mass become displaced a substantial distance relative to the casing about the roll axis. However, this condition is very unlikely to arise since the mass will move with the casing about the roll axis because of the acceleration forces experienced by the mass during the turn. The erecting button is biased against the spherical dome of the gyroscope by a spring which has a force just sufficient to overcome the force of gravity on the member supporting the erecting button, and the force of this spring will be overcome when acceleration forces experienced during a turn are added to the normal gravity forces. Therefore, the erection button will automtaically disengage the spherical dome during turns and will not erect the gyrovertical away from true vertical when the mass is under the influence of acceleration forces developed during turns.

It is therefore an object of the present invention to provide a very simple and inexpensive means of erecting a gyroscope into alignment with dynamic vertical.

A further object of the invention is to provide a simple, universally supported mass which is gravity sensitive and which carries erecting means for erecting a gyroscope to gravity vertical.

A still further object of the invention is to provide an erecting button mounted on a gravity-sensitive mass and spring biased against the gyro rotor in a manner that it can be disengaged when acceleration forces are encountered during a turn or when the mounting craft goes into a steep drive or climb.

These and other objects not specifically enumerated above will become readily apparent from the accompanying description and drawings in which:

Figure 5 is a vertical sectional view along line 5—5 of Figure 4 illustrating the manner in which the erecting button is spring-biased against the spherical dome.

Figure 6 is a horizontal sectional view along line 6—6 of Figure 3 with a section removed, and illustrating the ball bearings for mounting the gravity-sensitive mass.

Figure 7 is a vertical sectional view similar to that of Figure 5 illustrating the manner in which the erecting button is disengaged during a steep dive or climb.

Figure 1:
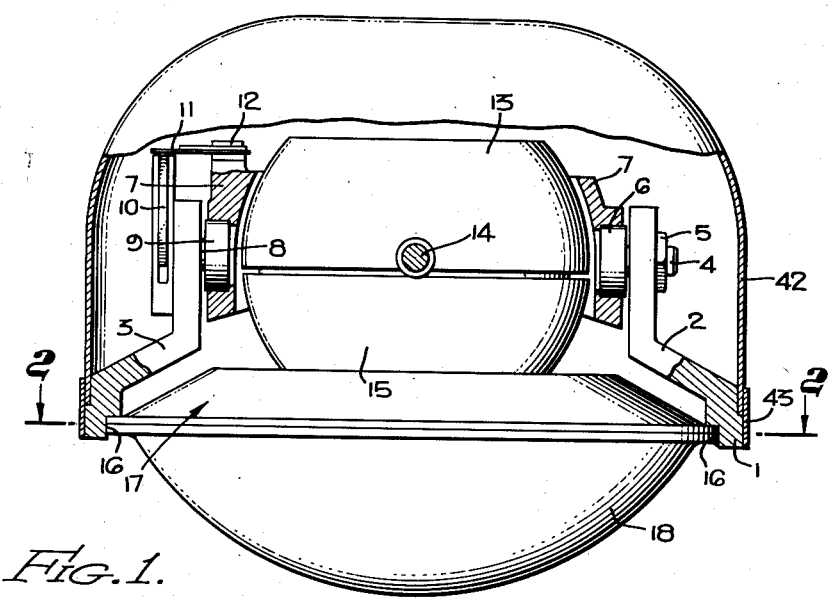
Figure 1 is an elevational view, partly in section, illustrating the mounting for the gyrovertical.
Figure 2:
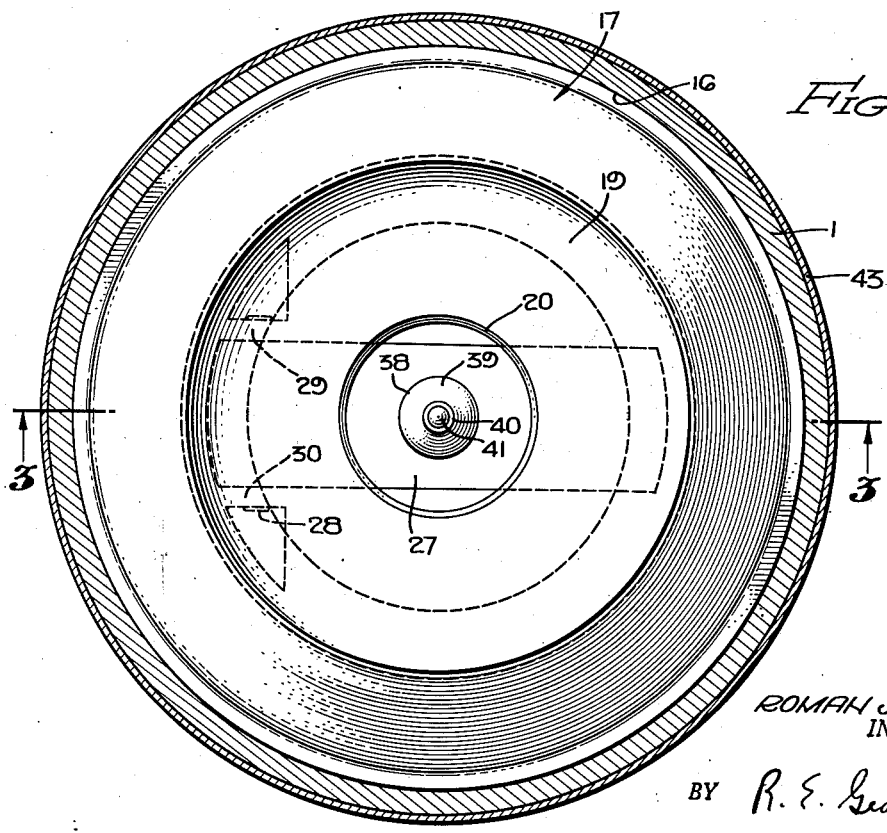
Figure 2 is a horizontal sectional view along line 2—2 of Figure 1 showing the erecting button.
Figure 3:
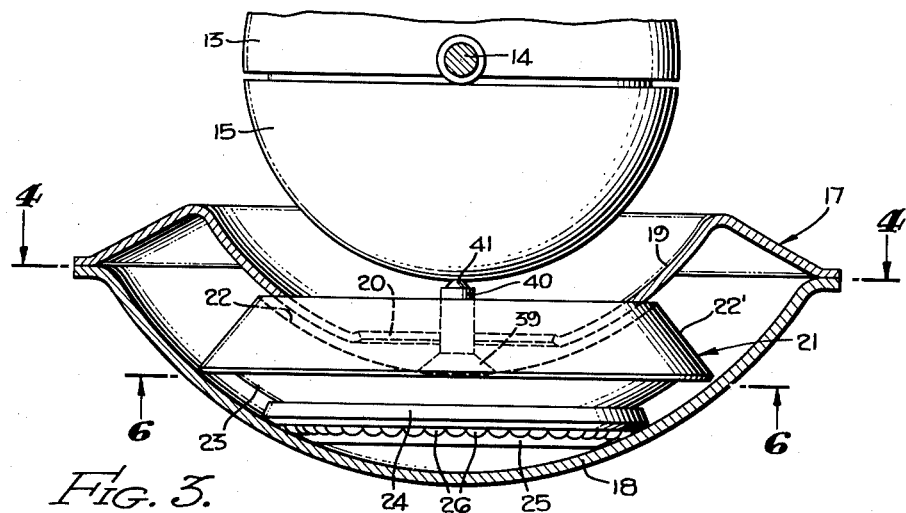
Figure 3 is a vertical sectional view along line 3—3 of Figure 2, with some parts in elevation, and showing the universally supported gravity-sensitive mass.
Figure 4:
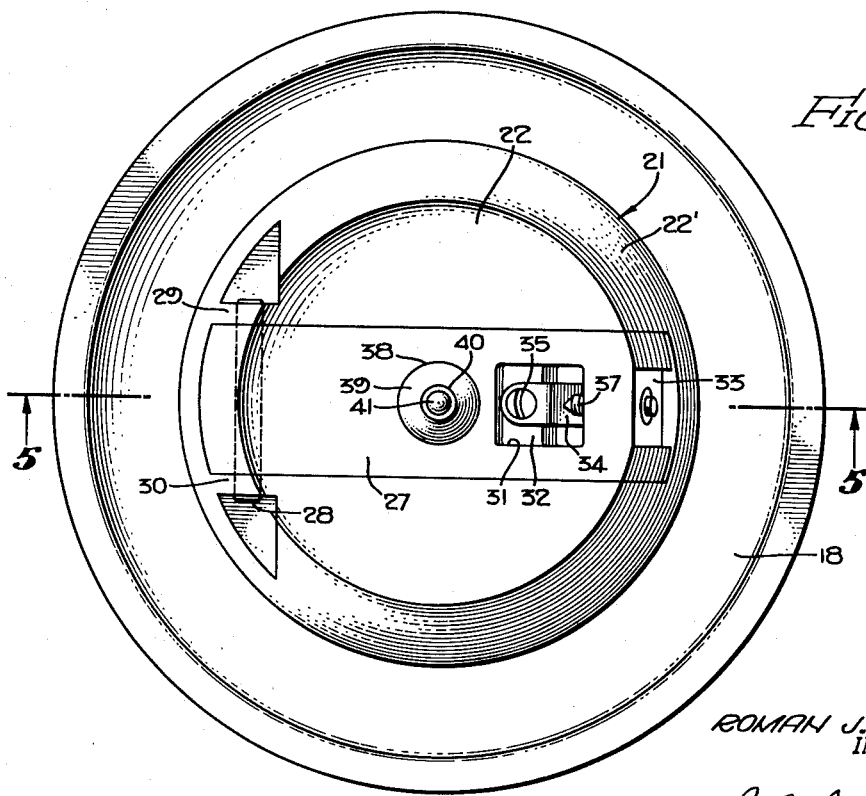
Figure 4 is a horizontal plan view taken along line 4—4 of Figure 3, with the upper part of the casing for the gravity-sensitive mass removed, to show the pivoted arm carried by the mass.

The embodiment of the present invention chosen for illustration comprises a support 1 for the gyrovertical, which has arms 2 and 3 projecting upwardly from the support. The arm 2 has a shaft 4 secured thereto by a nut 5, and this shaft 4 supports a ball bearing 6 which pivotally mounts one side of outer gimbal 7. The arm 3 carries a shaft 8 for mounting ball bearing 9, which supports the other side of the outer gimbal 7, and the arm 3 also carries a pickoff winding 10 which cooperates with a pickoff wiper 11 secured to the outer gimbal by screw 12. The pickoff, comprised of winding 10 and wiper 11, can be used to control the aircraft about the outer gimbal axis in any well-known manner. The inner gimbal 13 contains the gyro motor and is pivotally supported on its opposite sides by shafts (only shaft 14 being shown) mounted in the outer gimbal 7 and positioned ninety degrees from the outer gimbal axis. It is understood that a pickoff can likewise be placed about the inner gimbal axis in order to control the movement of the mounting craft about this same axis. The gyro motor drives a spherical dome 15 which receives erecting torques, in a manner presently to be described, in order to gravity-erect the gyrovertical about the inner and outer gimbal axes.

The support 1 has a groove 16 for receiving the edges of surfaces 17 and 18, and the edge of surface 18 can be welded to support 1 or otherwise secured thereto in order to retain the surfaces in position. Surface 17 has a spherical section 19 with a central opening surrounded by an upwardly turned edge 20. The surface 18 is spherical in shape and has a common center with dome 15, as does spherical section 19 of surface 17. A gravity-sensitive mass 21 has an upper, inside spherical surface 22 which which is positioned slightly below the spherical section 19 of surface 17. The upper, outside surface 22' of mass 21 is conical in shape, while the lower outside surface 23 is spherical and likewise concentric with the spherical dome 15.

The lower surface 23 mounts circular ball bearing retainer rings 24 and 25, between which are positioned ball bearings 26, so that the ball bearings extend completely around a circular path on surface 23. The bearings 26 are greater in diameter than the thickness of rings 24 and 25 so that they can continually bear against surface 18 and allow for movement of mass 21 relative to surfaces 17 and 18 in response to gravitational forces.

The mass 21 has a slot along one of its diameters for receiving an arm 27. This arm is pivotally mounted at one side of the mass by a pin 28 which is secured by extensions 29 and 30 formed by cutting away portions of the mass 21. On the opposite side from the pin 28, the arm 27 has an opening 31 which forms supporting sections 32 and 33. A leaf spring 34 is positioned in opening 31 and one end is secured to support section 32 by a screw 35 while the other end continually bears against the lower surface 36 of the slot which receives arm 27. A screw 37 is retained in support section 33 and has a conical end section bearing against the surface of spring 34 in order to adjust the upward force of spring 34 on arm 27. The center of arm 27 has a circular opening to receive support 38, which has a conical surface 39 and an extension 40 for receiving erecting button 41. The support 38 projects through the opening formed by edge 20 so that erecting button 41 can continually bear against the surface of spherical dome 15. It is apparent that the force of erecting button 41 against the spherical dome will be determined by the force of spring 34 on arm 27. This force is made just sufficient to overcome the normal force of gravity so that the erecting button will be continually forced into contact with the spherical dome when no other forces except gravity are present on the arm 27.

The operation of this invention will now be described by referring to the construction set forth above. When the aircraft is in normal flight, the mass 21 will be subjected to the force of gravity and can move relative to surface 18 in order to continually position the erecting button 41 in line with true gravity vertical about both the inner and outer gimbal axes of the gyrovertical. This relative movement can take place since the upper and lower surfaces of mass 21 are concentric with spherical surface 18 and spherical section 19 of surface 17, and the mass 21 will always seek the lowest position on the spherical surface 18. In the event that the mounting craft is placed into a turn, the mass 21 and arm 27 will experience an acceleration force as well as a gravitational force, and this addition of the acceleration force to arm 27 will be sufficient to overcome the force of spring 34 and cause the erecting button 41 to move away from spherical dome 15. Thus, when the craft is placed in a turn, the button 41 will cease to erect the gyrovertical and will not cause the gyrovertical to be moved away from the true vertical because of the movement of mass 21 away from true vertical due to acceleration forces. It is apparent that during a turn and while the erecting button 41 is disengaged, the mass 21 will move generally with the casing about the roll axis of the craft because of the acceleration forces, and it would be undesirable to have erection continued during this time.

In the event that the aircraft is placed into a steep dive or climb, the mass 21 will continue to be gravity-responsive until such time as the conical surface 39 of support 38 moves into contact with edge 20 of surface 17. In order to prevent the button 41 from in effect case-erecting the gyrovertical after support 38 contacts edge 20, it is provided that the upwardly turned edge 20 will engage the conical surface 39 and will force the arm 27 downwardly against the force of spring 34, in the manner illustrated in Figure 7, in order to disengage erecting button 41. Therefore, when it is no longer possible for the button 41 to gravity-erect about the pitch axis because of the steepness of a dive or climb, the button will be engaged from the spherical dome to prevent erection of the gyrovertical away from true vertical about the pitch axis and this action will take place even though no appreciable acceleration force is experienced by arm 27 in addition to the force of gravity because of the dive or climb.

The friction force normally exerted by erecting button 41 against the spherical dome 15 will cause the spin axis of the gyroscope to follow the button 41, and the gyroscope will be precessed toward the button until such time as the spin axis is in direct alignment with the erecting button. This principle of precession is well known in the art and can be done either by frictional force upon the dome or by electrical drag upon the dome. In other words, the erecting button 41 could be replaced by a small magnet positioned closely adjacent to the dome. The gyroscope is provided with a casing 42 which is secured by ring 43 to the support 1, and this casing serves to keep the gyrovertical free of dust and other foreign matter.

The present invention thus provides a novel device for continually gravity-erecting the spin axis of a gyrovertical during normal flight and is also provided with means for interrupting the erection of the gyrovertical under conditions in which the position of the erecting device does not correspond to its gravity vertical position. Thus, the spin axis of the gyroscope will not be erected out of its true vertical position by continuing the erection under conditions where the position of mass 21 is not determined solely by gravitational force. It is apparent that the gyrovertical of this invention can be positioned in any desired manner in a movable craft in order to control the craft about desired axes, and the mass 21 can assume any orientations with respect to the craft about the axis of extension 40 without affecting its operation. Further, the shape of the dome 15 and mass 21 can be changed so long as the mass can move in response to gravitational force and continually position the erecting means to exert an erecting force on the gyrovertical. Various other modifications are contemplated and may be resorted to by those skilled in the art, without departing from the spirit and scope of the invention, as herein defined by the appended claims.

What is claimed is:

1. In a gyrovertical instrument for a movable craft, a universally mounted gyroscope having a spherical dome attached thereto for rotation thereby, a gravity-sensitive mass supported for movement about a spherical surface concentric with said spherical dome, and erecting means carried by said mass for exerting a force upon said spherical dome to continually precess said gyroscope to true gravity vertical.

2. In a gyrovertical for a movable craft, a spherical dome secured to said gyrovertical for rotation thereby, a gravity-sensitive mass having upper and lower spherical surfaces concentric with said spherical dome, said gravity-sensitive mass being supported by a circular path of ball bearings on a spherical surface likewise concentric with said dome, and erecting means mounted by said mass and coacting with said spherical dome to continually precess said gyrovertical to its gravity vertical position.

3. A gyrovertical comprising a gravity-sensitive mass having a lower spherical surface, a spherical mounting surface for movably supporting said mass by said lower surface so that said mass will be positioned in accordance with the direction of gravitational force, and erecting means carried by said mass and acting upon said gyrovertical to maintain said gyrovertical in a gravity vertical position.

4. In a gyrovertical instrument for a movable craft, a gyroscope mounted by inner and outer gimbals for universal movement, a spherical dome attached to said gyroscope for rotation thereby, a spherical surface spaced from and concentric with said spherical dome and supporting a mass for movement relative to said dome in response to gravitational force, and erecting means positioned by said mass and coacting with said spherical dome for erecting said gyroscope to true gravity vertical about both the inner and outer gimbal axes.

5. In a gyrovertical for a movable craft, means connected to said gyrovertical for rotation thereby, gravity-sensitive means mounted on a spherical surface for movement about said surface relative to said rotating means in response to gravitational force, and erecting means carried by said gravity-sensitive means and positioned to continually cooperate with said rotating means in order to maintain said gyroscope in true gravity vertical position.

6. A gyrovertical for a moving craft, comprising a spherical dome connected with said gyrovertical for rotation thereby, a spherical surface spaced from said spherical dome and concentric therewith, a gravity-sensitive mass having a lower spherical contour and supported by said spherical surface, an arm pivotally mounted by said gravity-sensitive mass and carrying an erecting means positioned to contact said spherical dome, spring means acting against said arm to normally position said erecting means in contact with said dome, said spring means being overcome by forces in addition to the force of gravity to allow said erecting means to move away from said spherical dome, and stop means positioned to limit the movement of said erecting means relative to said craft, and means carried by said erecting means to disengage said erecting means from said spherical dome when said erecting means moves into contact with said stop means.

7. In a gyrovertical for a movable craft, means connected to said gyrovertical for rotation thereby, a gravity-sensitive mass mounted for limited movement relative to said craft in response to gravitational force, erecting means carried by an arm pivotally connected to said gravity-sensitive mass, a spring means for overcoming the force of gravity on said erecting means and positioning said erecting means in contact with said rotatable means, said contact being broken when forces in addition to gravity are encountered by said aircraft, and stop means for limiting the movement of said gravity-sensitive mass relative to said craft and simultaneously disengaging said erecting means from said rotating means when the limit of movement is reached.

8. In a gyrovertical instrument for a movable craft, a universally mounted gyroscope having a spherical dome attached thereto for rotation thereby, a gravity-sensitive mass supported for movement about a spherical surface concentric with said spherical dome, erecting means carried by said mass for exerting a force upon said spherical dome to continually precess said gyroscope to true gravity vertical, said erecting means being mounted on an arm pivotally connected to said mass, and spring means for normally urging said erecting means into coacting relationship with said spherical dome in order to precess said gyroscope.

9. In a gyrovertical for a movable craft, a spherical dome secured to said gyrovertical for rotation thereby, a gravity-sensitive mass having upper and lower spherical surfaces concentric with said spherical dome, said gravity-sensitive mass being supported by a circular path of ball bearings on a spherical surface likewise concentric with said dome, and erecting means mounted by said mass and coacting with said spherical dome to continually precess said gyrovertical to its gravity vertical position, said erecting means being carried by an arm pivotally mounted on said mass and having a spring means acting on said arm for continually forcing said erecting means into contact with said spherical dome, the force of said spring being just sufficient to overcome the force of gravity on said arm.

10. In a gyrovertical for a movable craft, means connected to said gyrovertical for rotation thereby, a rigid gravity-sensitive mass having a lower surface continually supported by a spherical mounting surface so that said mass can move about said mounting surface and relative to said rotating means in response to gravitational force, and erecting means positioned by said gravity-sensitive mass and acting upon said rotating means to maintain said gyrovertical in true gravity vertical position.

11. A gyrovertical comprising a rigid gravity-sensitive mass having a lower spherical surface, a spherical mounting surface concentric with said lower surface, bearing means positioned between said mounting surface and said lower surface to permit said mass to move relative to said mounting surface in response to gravitational force, and erecting means positioned by said mass and acting upon said gyrovertical to maintain said gyrovertical in true gravity vertical position.

12. A gyrovertical as defined in claim 11 wherein said bearing means comprises a circular ring of ball bearings.

13. In a gyrovertical instrument for a movable craft, a gyroscope having a rotor mounted by inner and outer gimbals, a spherical dome attached to said rotor for rotation thereby, a spherical mounting surface spaced from and concentric with said spherical dome, a rigid gravity-sensitive mass positioned between said dome and said mounting surface and having a lower spherical surface concentric with said dome, bearing means positioned between said lower surface and said mounting surface to permit said mass to move relative to said mounting surface in response to gravitational force, and erecting means positioned by said mass and coacting with said spherical dome for erecting said gyroscope to true gravity vertical about both the inner and outer gimbal axes.

14. In a gyrovertical as defined in claim 13 wherein said bearing means comprises a circular ring of ball bearings supported by said lower surface and bearing against said mounting surface.

15. In a gyrovertical for a movable craft, means connected to said gyrovertical for rotation thereby, a rigid gravity-sensitive mass having a lower surface mounted by a spherical surface so that said mass can move relative to said rotating means in response to gravitational force, and separate erecting means secured to said gravity-sensitive mass and positioned to continually act upon said rotating means in order to precess said gyroscope directly toward said erecting means when said gyroscope becomes displaced from true gravity vertical position.

References Cited in the file of this patent

UNITED STATES PATENTS

| | | |
|---|---|---|
| 2,339,606 | Sias | Jan. 18, 1944 |
| 2,422,120 | Noble | June 10, 1947 |
| 2,445,388 | Carlson | July 20, 1948 |
| 2,457,150 | Herondelle | Dec. 28, 1948 |

FOREIGN PATENTS

| | | |
|---|---|---|
| 636,828 | France | Jan. 16, 1928 |
| 282,633 | Great Britain | Mar. 8, 1928 |